(12) United States Patent
Ahn et al.

(10) Patent No.: US 12,732,588 B2
(45) Date of Patent: Sep. 8, 2026

(54) DISPLAY DEVICE AND OPERATING METHOD THEREFOR

(71) Applicant: LG ELECTRONICS INC., Seoul (KR)

(72) Inventors: Sungdae Ahn, Seoul (KR); Jongho Park, Seoul (KR)

(73) Assignee: LG ELECTRONICS INC., Seoul (KR)

( * ) Notice: Subject to any disclaimer, the term of this patent is extended or adjusted under 35 U.S.C. 154(b) by 0 days.

(21) Appl. No.: 18/873,083

(22) PCT Filed: Jul. 1, 2022

(86) PCT No.: PCT/KR2022/009487
§ 371 (c)(1),
(2) Date: Dec. 9, 2024

(87) PCT Pub. No.: WO2024/005241
PCT Pub. Date: Jan. 4, 2024

(65) Prior Publication Data

US 2025/0358381 A1 Nov. 20, 2025

(51) Int. Cl.
*H04N 5/21* (2006.01)
*H04N 5/14* (2006.01)
*H04N 5/52* (2006.01)

(52) U.S. Cl.
CPC ............... *H04N 5/21* (2013.01); *H04N 5/142* (2013.01); *H04N 5/144* (2013.01); *H04N 5/52* (2013.01)

(58) Field of Classification Search
CPC .......... H04N 5/21; H04N 5/142; H04N 5/144; H04N 5/52; H04N 5/14; H04N 9/64
See application file for complete search history.

(56) References Cited

U.S. PATENT DOCUMENTS 8,406,482 B1 3/2013 Chien et al.
2009/0226112 A1 9/2009 Park et al.
(Continued)

FOREIGN PATENT DOCUMENTS

JP H0530414 A * 2/1993
KR 10-2007-0072147 7/2007
(Continued)

OTHER PUBLICATIONS

PCT International Application No. PCT/KR2022/009487, International Search Report dated Mar. 24, 2023, 4 pages.
(Continued)

*Primary Examiner* — Michael Lee

(74) *Attorney, Agent, or Firm* — LEE, HONG, DEGERMAN, KANG & WAIMEY

(57) ABSTRACT

A display device according to an embodiment of the present disclosure comprises: a controller for acquiring motion information from video data, and generating result video data on the basis of a gain value corresponding to the motion information; and a display for outputting an image on the basis of the result video data, wherein the controller can acquire the result video data by applying different gain values to a motion region and a remaining region that excludes the motion region, if the area of the motion region is sensed, on the basis the motion information, as having a predetermined proportion or less to the total image area.

15 Claims, 8 Drawing Sheets

(56) References Cited

U.S. PATENT DOCUMENTS

| | | | | |
|---|---|---|---|---|
| 2010/0141674 | A1 | 6/2010 | Ohara et al. | |
| 2012/0033137 | A1* | 2/2012 | Fujiyama | H04N 5/21 348/E5.077 |
| 2015/0138441 | A1 | 5/2015 | Pavani | |
| 2016/0335752 | A1 | 11/2016 | Lim et al. | |
| 2018/0115745 | A1* | 4/2018 | Kimura | G09G 5/00 |
| 2020/0053332 | A1 | 2/2020 | Seok | |
| 2020/0074911 | A1 | 3/2020 | Park et al. | |

FOREIGN PATENT DOCUMENTS

| | | |
|---|---|---|
| KR | 10-2009-0095818 | 9/2009 |
| KR | 10-2011-0090068 | 8/2011 |
| KR | 10-2016-0133699 | 11/2016 |
| KR | 10-2018-0108201 | 10/2018 |
| KR | 10-2019-0109204 | 9/2019 |

OTHER PUBLICATIONS

Korean Intellectual Property Office Application No. 10-2024-7039065, Office Action dated Mar. 23, 2026, 5 pages.

* cited by examiner

Figure 2:
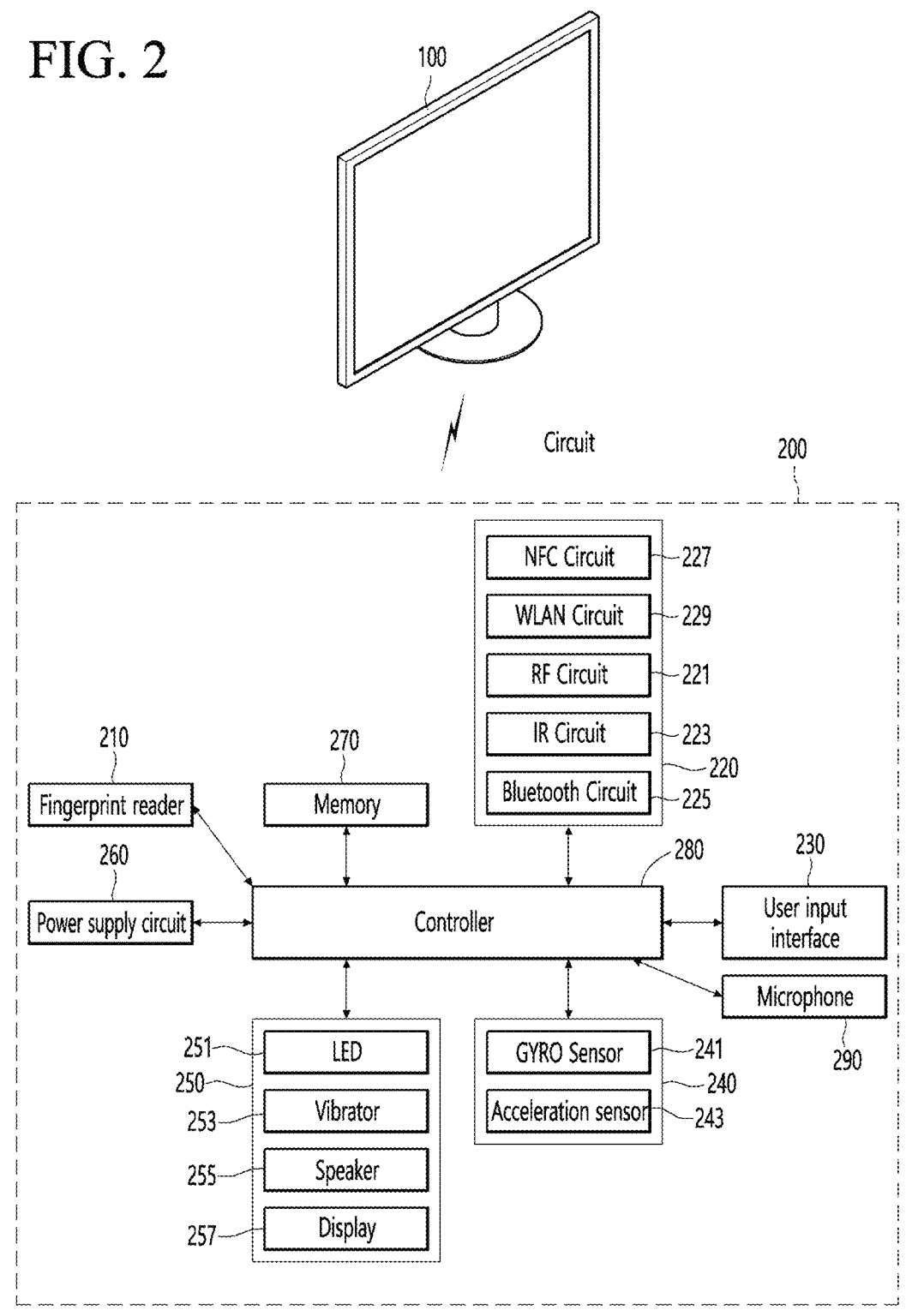

Circuit

200

NFC Circuit 227

WLAN Circuit 229

RF Circuit 221

IR Circuit 223

220

Bluetooth Circuit 225

210

Fingerprint reader

270

Memory

260

Power supply circuit

280

Controller

230

User input interface

Microphone

290

251 LED

250

253 Vibrator

255 Speaker

257 Display

GYRO Sensor 241

240

Acceleration sensor 243

180
205
200
(a)
(b)
(c)

(a)

(b)

DISPLAY DEVICE AND OPERATING METHOD THEREFOR

CROSS-REFERENCE TO RELATED APPLICATION

This application is the National Stage filing under 35 U.S.C. 371 of International Application No. PCT/KR2022/009487, filed on Jul. 1, 2022, the contents of which are hereby incorporated by reference herein its entirety.

TECHNICAL FIELD

The present disclosure relates to a display device and an operating method thereof. More specifically, the present disclosure relates to a display device for removing contour noise and an operating method thereof.

BACKGROUND ART

A display device is a device that has the function of receiving, processing, and displaying images that can be viewed by a user. For example, a display device receives a broadcast signal selected by a user from among broadcasting signals transmitted from a broadcasting station, separates an image signal from the received signal, and then displays the separated image signal on a display.

Meanwhile, when outputting an image using a display device, contour noise generally occurs.

The contour noise, also known as pseudo-contour, refers to a deterioration phenomenon in which noise in the form of a contour is observed in areas of flat brightness in the original image where there is no actual contour.

This contour noise is noise that occurs during the quantization process that is performed when acquiring an image, the image compression and restoration process, and the image processing process for improving image quality, and can be mainly seen in flat areas.

Meanwhile, current display devices remove contour noise with consistent intensity (such as using a static curve) to remove contour noise from an image. In this case, since the contour noise is removed without considering the detail information and motion information of the image at all, side effects such as blurring or halos around objects occur in images with fast motion. Therefore, a method for removing contour noise that considers the detail information and motion information of the image is required.

In addition, when removing contour noise by considering motion information, if the intensity for removing contour noise is applied equally to the area where motion occurs and the area where motion does not occur, blurring or halos around objects may occur in the area where motion occurs.

DISCLOSURE

Technical Problem

The present disclosure seeks to minimize the problem of side effects such as blurring and smudging occurring in motion-occurring areas due to contour noise removal operations.

The present disclosure seeks to minimize side effects such as blurring and smudging in motion-occurring areas when motion occurs only in a certain area of an image, and to minimize contour noise in areas where motion does not occur.

Technical Solution

A display device according to an embodiment of present disclosure comprises a controller configured to obtain motion information from video data and generate result video data based on a gain value corresponding to the motion information, and a display configured to output an image based on the result video data, wherein the controller is configured to obtain the result video data by applying different gain values to a motion area and a remaining area excluding the motion area, if the area of the motion area is detected to be less than or equal to a predetermined ratio of an entire image area based on the motion information.

The controller is configured to obtain a first gain value to be applied to the motion area, obtain a second gain value to be applied to the remaining area, and the first gain value is less than or equal to the second gain value.

The controller is configured to obtain a third gain value to be applied to the entire image when the area of the motion area is detected to exceed the predetermined ratio of the entire image area.

The third gain value is greater than or equal to the first gain value and less than or equal to the second gain value.

The display device further comprises a memory configured to store de-contour gain information including the gain value corresponding to the motion information.

The de-contour gain information includes: a first table in which motion information and a gain value are mapped when the area of the motion area exceeds a predetermined ratio of the entire image area, a second table in which motion information and a gain value to be applied to the remaining area are mapped when the area of the motion area is less than or equal to a predetermined ratio of the entire image area, and a third table in which motion information and a gain value to be applied to the motion area are mapped when the area of the motion area is less than or equal to a predetermined ratio of the entire image area.

A gain value when the motion information is maximum in the first table is a first value, a gain value when the motion information is maximum in the second table is a second value greater than the first value, a gain value when the motion information is maximum in the third table is a third value less than the first value.

The gain values when the motion information is minimum in the first to third tables are the same.

The controller is configured to obtain the motion information based on differences in pixel data of consecutive frames in the video data.

The controller is configured to detect a de-contour exception area that includes at least one of a high luminance area, a skin area, and a detail area, and does not apply the gain value to the de-contour exception area.

An operating method of a display device according to an embodiment of present disclosure, comprising obtaining motion information from video data, generating result video data based on a gain value corresponding to the motion information, and outputting an image based on the result video data, and wherein the generating of the result video data comprises detecting whether an area of a motion area is less than or equal to a predetermined ratio of an entire image area based on the motion information, and obtaining the result video data by applying different gain values to the motion area and a remaining area excluding the motion area, if the area of the motion area is detected to be less than or equal to a predetermined ratio of the entire image area.

The generating of the result video data further comprises obtaining a first gain value to be applied to the motion area, and obtaining a second gain value to be applied to the remaining area, and the first gain value is less than or equal to the second gain value.

The generating of the result video data further comprises obtaining a third gain value to be applied to the entire image when the area of the motion area is detected to exceed the predetermined ratio of the entire image area.

The operating method of a display device further comprises storing de-contour gain information including the gain value corresponding to the motion information.

The de-contour gain information includes a first table in which motion information and a gain value are mapped when the area of the motion area exceeds a predetermined ratio of the entire image area, a second table in which motion information and a gain value to be applied to the remaining area are mapped when the area of the motion area is less than or equal to a predetermined ratio of the entire image area, and a third table in which motion information and a gain value to be applied to the motion area are mapped when the area of the motion area is less than or equal to a predetermined ratio of the entire image area.

Advantageous Effects

According to an embodiment of the present disclosure, since a gain value for removing contour noise is applied differently to a motion area and a remaining area, there is an advantage in that the problem of deterioration of sharpness in the motion area can be minimized while removing contour noise in the remaining area.

According to an embodiment of the present disclosure, since a gain value for removing contour noise is applied differently depending on whether it is global motion or local motion, there is an advantage in that the sharpness and detail components of the image can be protected while removing contour noise more effectively.

DESCRIPTION OF DRAWINGS

FIG. 2 is a block diagram of a remote control device according to an embodiment of the present disclosure.

BEST MODE

Hereinafter, embodiments of the present disclosure will be described in detail with reference to the drawings. The suffixes "module" and "unit or portion" for components used in the following description are merely provided only for facilitation of preparing this specification, and thus they are not granted a specific meaning or function.

A display device according to an embodiment of the present disclosure is, for example, an intelligent display device in which a computer support function is added to a broadcast reception function, and may have an easy-to-use interface such as a handwritten input device, a touch screen, a spatial remote control, or the like since an Internet function is added while fulfilling the broadcast receiving function. In addition, it is connected to the Internet and a computer with the support of a wired or wireless Internet function, so that functions such as e-mail, web browsing, banking, or games can also be performed. A standardized general-purpose OS may be used for these various functions.

Accordingly, in the display device described in the present disclosure, various user-friendly functions can be performed because various applications can be freely added or deleted, for example, on a general-purpose OS kernel. More specifically, the display device may be, for example, a network TV, HBBTV, smart TV, LED TV, OLED TV, and the like, and may be applied to a smart phone in some cases.

Figure 1:
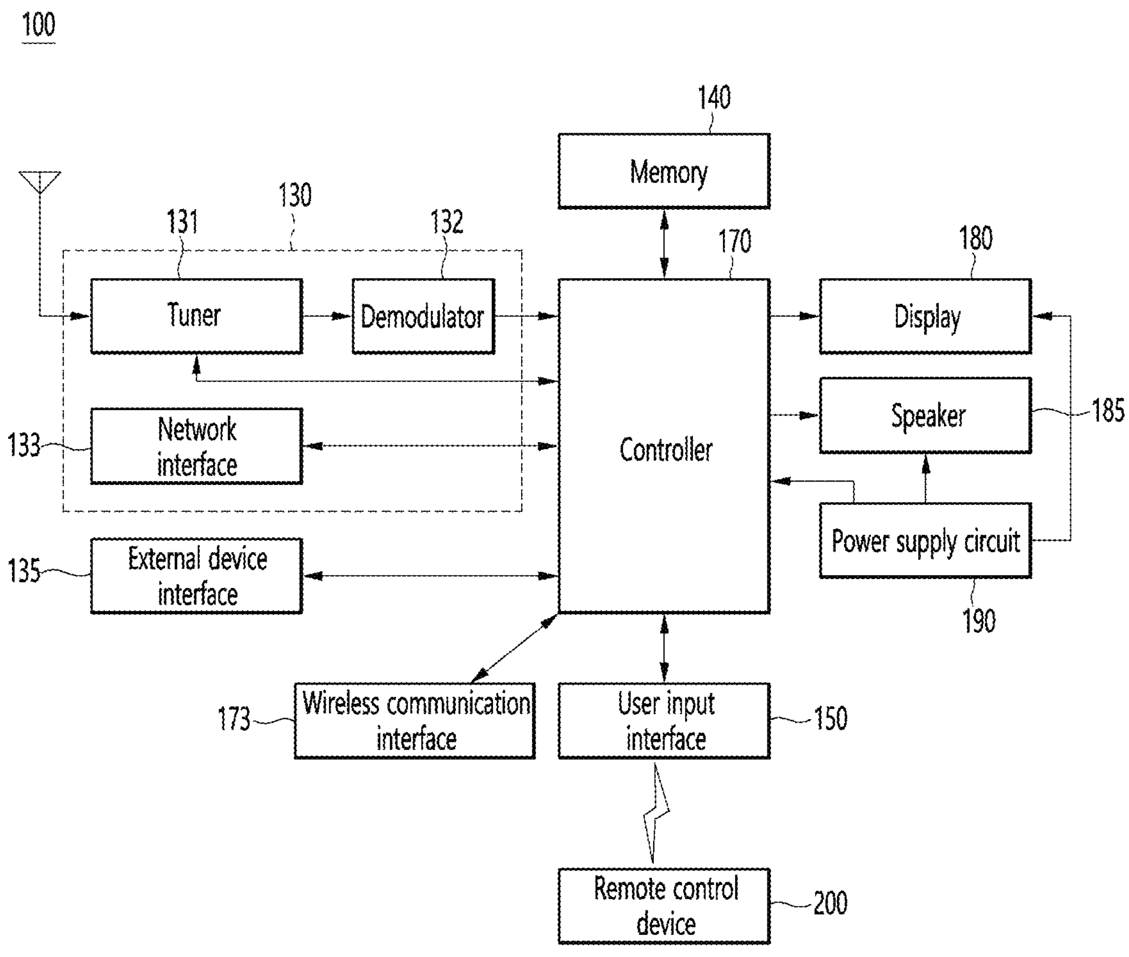
FIG. 1 is a block diagram illustrating a configuration of a display device according to an embodiment of the present disclosure.

FIG. 1 is a block diagram showing a configuration of a display device according to an embodiment of the present disclosure.

Referring to FIG. 1, a display device 100 may include a broadcast receiver 130, an external device interface 135, a memory 140, a user input interface 150, a controller 170, a wireless communication interface 173, a display 180, a speaker 185, and a power supply circuit 190.

The broadcast receiver 130 may include a tuner 131, a demodulator 132, and a network interface 133.

The tuner 131 may select a specific broadcast channel according to a channel selection command. The tuner 131 may receive a broadcast signal for the selected specific broadcast channel.

The demodulator 132 may separate the received broadcast signal into an image signal, an audio signal, and a data signal related to a broadcast program, and restore the separated image signal, audio signal, and data signal to a format capable of being output.

The external device interface 135 may receive an application or a list of applications in an external device adjacent thereto, and transmit the same to the controller 170 or the memory 140.

The external device interface 135 may provide a connection path between the display device 100 and an external device. The external device interface 135 may receive one or more of images and audio output from an external device connected to the display device 100 in a wired or wireless manner, and transmit the same to the controller 170. The external device interface 135 may include a plurality of external input terminals. The plurality of external input terminals may include an RGB terminal, one or more High Definition Multimedia Interface (HDMI) terminals, and a component terminal.

The image signal of the external device input through the external device interface 135 may be output through the display 180. The audio signal of the external device input through the external device interface 135 may be output through the speaker 185.

The external device connectable to the external device interface 135 may be any one of a set-top box, a Blu-ray player, a DVD player, a game machine, a sound bar, a smartphone, a PC, a USB memory, and a home theater, but this is only an example.

The network interface 133 may provide an interface for connecting the display device 100 to a wired/wireless network including an Internet network. The network interface 133 may transmit or receive data to or from other users or other electronic devices through a connected network or another network linked to the connected network.

In addition, a part of content data stored in the display device 100 may be transmitted to a selected user among a selected user or a selected electronic device among other users or other electronic devices registered in advance in the display device 100.

The network interface 133 may access a predetermined web page through the connected network or the other network linked to the connected network. That is, it is possible to access a predetermined web page through a network, and transmit or receive data to or from a corresponding server.

In addition, the network interface 133 may receive content or data provided by a contents provider or a network operator. That is, the network interface 133 may receive content such as movies, advertisements, games, VOD, and broadcast signals and information related thereto provided from a contents provider or a network provider through a network.

In addition, the network interface 133 may receive update information and update files of firmware provided by the network operator, and may transmit data to an Internet or contents provider or a network operator.

The network interface 133 may select and receive a desired application from among applications that are open to the public through a network.

The memory 140 may store programs for signal processing and control of the controller 170, and may store images, audio, or data signals, which have been subjected to signal-processed.

In addition, the memory 140 may perform a function for temporarily storing images, audio, or data signals input from an external device interface 135 or the network interface 133, and store information on a predetermined image through a channel storage function.

The memory 140 may store an application or a list of applications input from the external device interface 135 or the network interface 133.

The display device 100 may play a content file (a moving image file, a still image file, a music file, a document file, an application file, or the like) stored in the memory 140 and provide the same to the user.

The user input interface 150 may transmit a signal input by the user to the controller 170 or a signal from the controller 170 to the user. For example, the user input interface 150 may receive and process a control signal such as power on/off, channel selection, screen settings, and the like from the remote control device 200 in accordance with various communication methods, such as a Bluetooth communication method, a WB (Ultra Wideband) communication method, a ZigBee communication method, an RF (Radio Frequency) communication method, or an infrared (IR) communication method or may perform processing to transmit the control signal from the controller 170 to the remote control device 200.

In addition, the user input interface 150 may transmit a control signal input from a local key (not shown) such as a power key, a channel key, a volume key, and a setting value to the controller 170.

The image signal image-processed by the controller 170 may be input to the display 180 and displayed as an image corresponding to a corresponding image signal. Also, the image signal image-processed by the controller 170 may be input to an external output device through the external device interface 135.

The audio signal processed by the controller 170 may be output to the speaker 185. Also, the audio signal processed by the controller 170 may be input to the external output device through the external device interface 135.

In addition, the controller 170 may control the overall operation of the display device 100.

In addition, the controller 170 may control the display device 100 by a user command input through the user input interface 150 or an internal program and connect to a network to download an application a list of applications or applications desired by the user to the display device 100.

The controller 170 may allow the channel information or the like selected by the user to be output through the display 180 or the speaker 185 along with the processed image or audio signal.

In addition, the controller 170 may output an image signal or an audio signal through the display 180 or the speaker 185, according to a command for playing an image of an external device through the user input interface 150, the image signal or the audio signal being input from an external device, for example, a camera or a camcorder, through the external device interface 135.

Meanwhile, the controller 170 may allow the display 180 to display an image, for example, allow a broadcast image which is input through the tuner 131 or an external input image which is input through the external device interface 135, an image which is input through the network interface or an image which is stored in the memory 140 to be displayed on the display 180. In this case, an image being displayed on the display 180 may be a still image or a moving image, and may be a 2D image or a 3D image.

In addition, the controller 170 may allow content stored in the display device 100, received broadcast content, or external input content input from the outside to be played, and the content may have various forms such as a broadcast image, an external input image, an audio file, still images, accessed web screens, and document files.

The wireless communication interface 173 may communicate with an external device through wired or wireless communication. The wireless communication interface 173 may perform short range communication with an external device. To this end, the wireless communication interface 173 may support short range communication using at least one of Bluetooth™, Radio Frequency Identification (RFID), Infrared Data Association (IrDA), Ultra Wideband (UWB), ZigBee, Near Field Communication (NFC), Wi-Fi (Wireless-Fidelity), Wi-Fi (Wireless-Fidelity), Wi-Fi Direct, and Wireless USB (Wireless Universal Serial Bus) technologies. The wireless communication interface 173 may support wireless communication between the display device 100 and a wireless communication system, between the display device 100 and another display device 100, or between the display device 100 and a network in which the display device 100 (or an external server) is located through wireless area networks. The wireless area networks may be wireless personal area networks.

Here, another display device 100 may be a wearable device (e.g., a smartwatch, smart glasses or a head mounted display (HMD), a mobile terminal such as a smart phone, which is able to exchange data (or interwork) with the display device 100 according to the present disclosure. The wireless communication interface 173 may detect (or recognize) a wearable device capable of communication around the display device 100.

Furthermore, when the detected wearable device is an authenticated device to communicate with the display device 100 according to the present disclosure, the controller 170 may transmit at least a portion of data processed by the display device 100 to the wearable device through the wireless communication interface 173. Therefore, a user of the wearable device may use data processed by the display device 100 through the wearable device.

The display 180 may convert image signals, data signals, and OSD signals processed by the controller 170, or image signals or data signals received from the external device interface 135 into R, G, and B signals, and generate drive signals.

Meanwhile, since the display device 100 shown in FIG. 1 is only an embodiment of the present disclosure, some of the illustrated components may be integrated, added, or omitted depending on the specification of the display device 100 that is actually implemented.

That is, two or more components may be combined into one component, or one component may be divided into two or more components as necessary. In addition, a function performed in each block is for describing an embodiment of the present disclosure, and its specific operation or device does not limit the scope of the present disclosure.

According to another embodiment of the present disclosure, unlike the display device 100 shown in FIG. 1, the display device 100 may receive an image through the network interface 133 or the external device interface 135 without a tuner 131 and a demodulator 132 and play the same.

For example, the display device 100 may be divided into an image processing device, such as a set-top box, for receiving broadcast signals or content according to various network services, and a content playback device that plays content input from the image processing device.

In this case, an operation method of the display device according to an embodiment of the present disclosure will be described below may be implemented by not only the display device 100 as described with reference to FIG. 1 and but also one of an image processing device such as the separated set-top box and a content playback device including the display 180 and the speaker 185.

Next, a remote control device according to an embodiment of the present disclosure will be described with reference to FIGS. 2 to 3.

Figure 3:
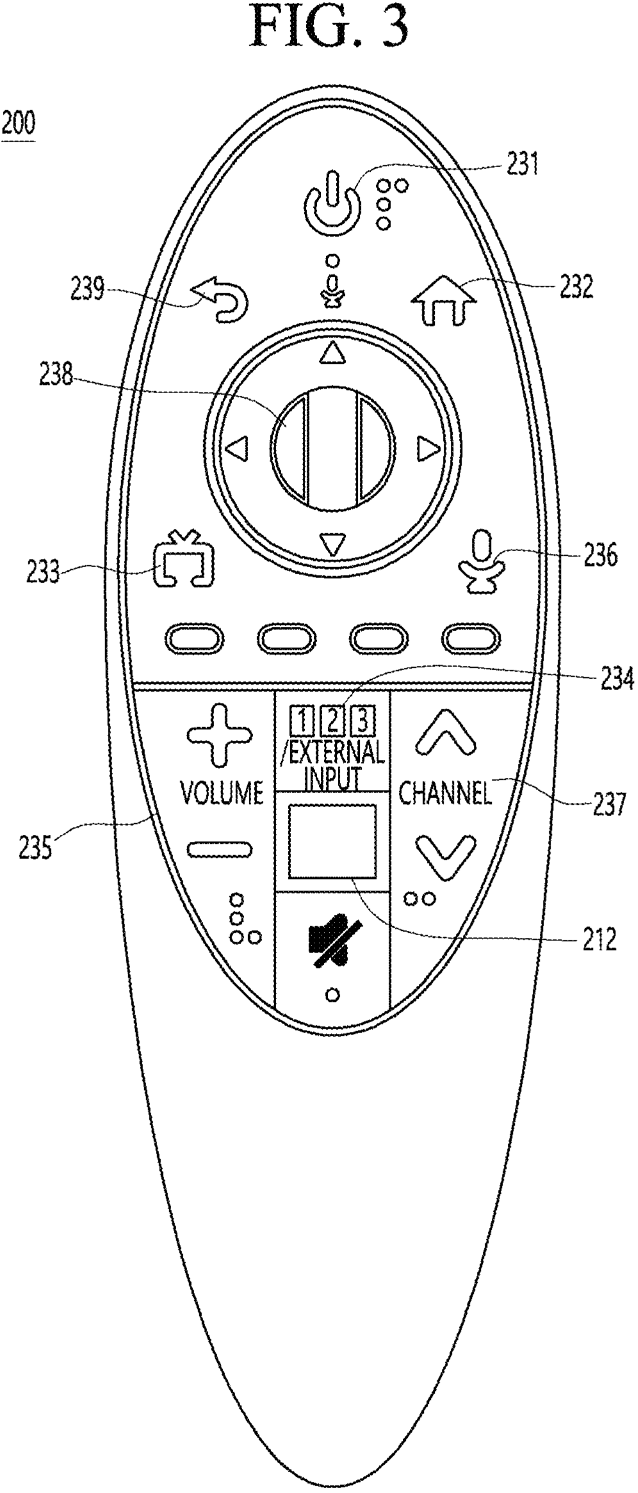
FIG. 3 shows an example of an actual configuration of a remote control device (200) according to an embodiment of the present disclosure.

FIG. 2 is a block diagram of a remote control device according to an embodiment of the present disclosure, and FIG. 3 shows an actual configuration example of a remote control device 200 according to an embodiment of the present disclosure.

First, referring to FIG. 2, the remote control device 200 may include a fingerprint reader 210, a wireless communication circuit 220, a user input interface 230, a sensor 240, an output interface 250, a power supply circuit 260, a memory 270, a controller 280, and a microphone 290.

Referring to FIG. 2, the wireless communication circuit 220 may transmit and receive signals to and from any one of display devices according to embodiments of the present disclosure described above.

The remote control device 200 may include an RF circuit 221 capable of transmitting and receiving signals to and from the display device 100 according to the RF communication standard, and an IR circuit 223 capable of transmitting and receiving signals to and from the display device 100 according to the IR communication standard. In addition, the remote control device 200 may include a Bluetooth circuit 225 capable of transmitting and receiving signals to and from the display device 100 according to the Bluetooth communication standard. In addition, the remote control device 200 may include an NFC circuit 227 capable of transmitting and receiving signals to and from the display device 100 according to the NFC (near field communication) communication standard, and a WLAN circuit 229 capable of transmitting and receiving signals to and from the display device 100 according to the wireless LAN (WLAN) communication standard.

In addition, the remote control device 200 may transmit a signal containing information on the movement of the remote control device 200 to the display device 100 through the wireless communication circuit 220.

In addition, the remote control device 200 may receive a signal transmitted by the display device 100 through the RF circuit 221, and transmit a command regarding power on/off, channel change, volume adjustment, or the like to the display device 100 through the IR circuit 223 as necessary.

The user input interface 230 may include a keypad, a button, a touch pad, a touch screen, or the like. The user may input a command related to the display device 100 to the remote control device 200 by operating the user input interface 230. When the user input interface 230 includes a hard key button, the user may input a command related to the display device 100 to the remote control device 200 through a push operation of the hard key button. Details will be described with reference to FIG. 3.

Referring to FIG. 3, the remote control device 200 may include a plurality of buttons. The plurality of buttons may include a fingerprint recognition button 212, a power button 231, a home button 232, a live button 233, an external input button 234, a volume control button 235, a voice recognition button 236, a channel change button 237, an OK button 238, and a back-play button 239.

The fingerprint recognition button 212 may be a button for recognizing a user's fingerprint. In one embodiment, the fingerprint recognition button 212 may enable a push operation, and thus may receive a push operation and a fingerprint recognition operation.

The power button 231 may be a button for turning on/off the power of the display device 100.

The home button 232 may be a button for moving to the home screen of the display device 100.

The live button 233 may be a button for displaying a real-time broadcast program.

The external input button 234 may be a button for receiving an external input connected to the display device 100.

The volume control button 235 may be a button for adjusting the level of the volume output by the display device 100.

The voice recognition button 236 may be a button for receiving a user's voice and recognizing the received voice.

The channel change button 237 may be a button for receiving a broadcast signal of a specific broadcast channel.

The OK button 238 may be a button for selecting a specific function, and the back-play button 239 may be a button for returning to a previous screen.

A description will be given referring again to FIG. 2.

When the user input interface 230 includes a touch screen, the user may input a command related to the display device 100 to the remote control device 200 by touching a soft key of the touch screen. In addition, the user input interface 230 may include various types of input means that may be operated by a user, such as a scroll key or a jog key, and the present embodiment does not limit the scope of the present disclosure.

The sensor 240 may include a gyro sensor 241 or an acceleration sensor 243, and the gyro sensor 241 may sense information regarding the movement of the remote control device 200.

For example, the gyro sensor 241 may sense information about the operation of the remote control device 200 based on the x, y, and z axes, and the acceleration sensor 243 may sense information about the moving speed of the remote control device 200. Meanwhile, the remote control device 200 may further include a distance measuring sensor to sense the distance between the display device 100 and the display 180.

The output interface 250 may output an image or audio signal corresponding to the operation of the user input interface 230 or a signal transmitted from the display device 100.

The user may recognize whether the user input interface 230 is operated or whether the display device 100 is controlled through the output interface 250.

For example, the output interface 450 may include an LED 251 that emits light, a vibrator 253 that generates vibration, a speaker 255 that outputs sound, or a display 257 that outputs an image when the user input interface 230 is operated or a signal is transmitted and received to and from the display device 100 through the wireless communication interface 225.

In addition, the power supply circuit 260 may supply power to the remote control device 200, and stop power supply when the remote control device 200 has not moved for a predetermined time to reduce power consumption.

The power supply circuit 260 may restart power supply when a predetermined key provided in the remote control device 200 is operated.

The memory 270 may store various types of programs and application data required for control or operation of the remote control device 200.

When the remote control device 200 transmits and receives signals wirelessly through the display device 100 and the RF circuit 221, the remote control device 200 and the display device 100 transmit and receive signals through a predetermined frequency band.

The controller 280 of the remote control device 200 may store and refer to information on a frequency band capable of wirelessly transmitting and receiving signals to and from the display device 100 paired with the remote control device 200 in the memory 270.

The controller 280 may control all matters related to the control of the remote control device 200. The controller 280 may transmit a signal corresponding to a predetermined key operation of the user input interface 235 or a signal corresponding to the movement of the remote control device 200 sensed by the sensor 240 through the wireless communication interface 225.

Also, the microphone 290 of the remote control device 200 may obtain a speech.

A plurality of microphones 290 may be provided.

Next, a description will be given referring to FIG. 4.

Figure 4:
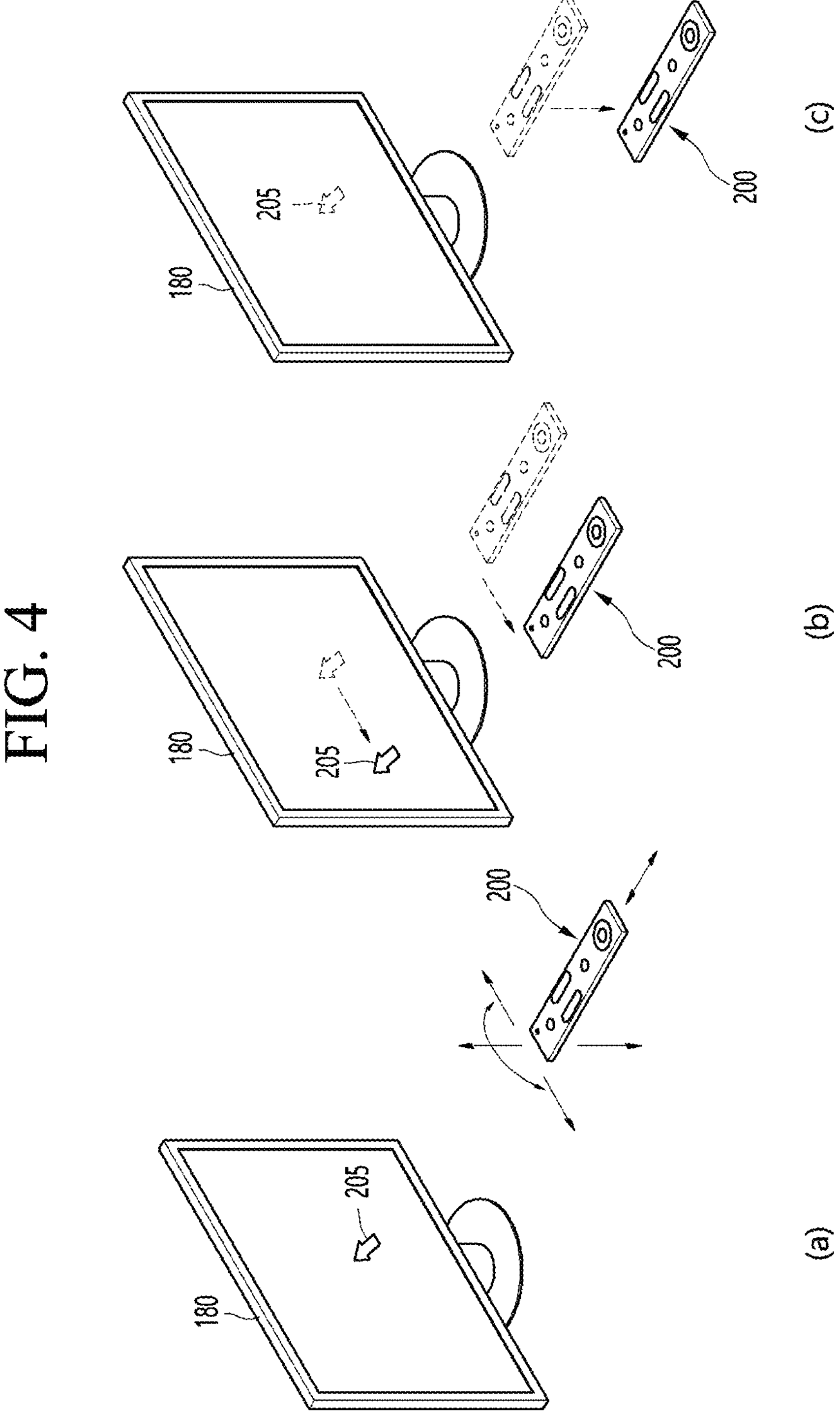
FIG. 4 shows an example of utilizing a remote control device according to an embodiment of the present disclosure.

FIG. 4 shows an example of using a remote control device according to an embodiment of the present disclosure.

In FIG. 4, (a) illustrates that a pointer 205 corresponding to the remote control device 200 is displayed on the display 180.

The user may move or rotate the remote control device 200 up, down, left and right. The pointer 205 displayed on the display 180 of the display device 100 may correspond to the movement of the remote control device 200. As shown in the drawings, the pointer 205 is moved and displayed according to movement of the remote control device 200 in a 3D space, so the remote control device 200 may be called a space remote control device.

In (b) of FIG. 4, it is illustrated that that when the user moves the remote control device 200 to the left, the pointer 205 displayed on the display 180 of the display device 100 moves to the left correspondingly.

Information on the movement of the remote control device 200 detected through a sensor of the remote control device 200 is transmitted to the display device 100. The display device 100 may calculate the coordinates of the pointer 205 based on information on the movement of the remote control device 200. The display device 100 may display the pointer 205 to correspond to the calculated coordinates.

In (c) of FIG. 4, it is illustrated that a user moves the remote control device 200 away from the display 180 while pressing a specific button in the remote control device 200. Accordingly, a selected area in the display 180 corresponding to the pointer 205 may be zoomed in and displayed enlarged.

Conversely, when the user moves the remote control device 200 to be close to the display 180, the selected area in the display 180 corresponding to the pointer 205 may be zoomed out and displayed reduced.

On the other hand, when the remote control device 200 moves away from the display 180, the selected area may be zoomed out, and when the remote control device 200 moves to be close to the display 180, the selected area may be zoomed in.

Also, in a state in which a specific button in the remote control device 200 is being pressed, recognition of up, down, left, or right movements may be excluded. That is, when the remote control device 200 moves away from or close to the display 180, the up, down, left, or right movements are not recognized, and only the forward and backward movements may be recognized. In a state in which a specific button in the remote control device 200 is not being pressed, only the pointer 205 moves according to the up, down, left, or right movements of the remote control device 200.

Meanwhile, the movement speed or the movement direction of the pointer 205 may correspond to the movement speed or the movement direction of the remote control device 200.

Meanwhile, in the present specification, a pointer refers to an object displayed on the display 180 in response to an operation of the remote control device 200. Accordingly, objects of various shapes other than the arrow shape shown in the drawings are possible as the pointer 205. For example, the object may be a concept including a dot, a cursor, a prompt, a thick outline, and the like. In addition, the pointer 205 may be displayed corresponding to any one point among points on a horizontal axis and a vertical axis on the display 180, and may also be displayed corresponding to a plurality of points such as a line and a surface.

Meanwhile, when outputting an image from a display device 100, contour noise may occur. The contour noise is caused by loss of image information due to image compression.

The display device 100 can perform an operation to remove this contour noise, and this can be named 'de-contour', but this is only named for convenience of explanation, and therefore it is reasonable not to be limited to this name.

One of the methods for removing contour noise by the display device 100 is to insert a blur image of an original image into the original image to generate a blurred image. The display device 100 can remove contour noise by synthesizing and blending the original image and the blurred image.

Specifically, the controller 170 generates a blur image of the original image and, if the mean absolute deviation (MAD) is large compared to pixels of the original image, reduces the gain value indicating a degree of de-contouring to protect detail components of the image, and if the mean absolute deviation is small compared to pixels of the original image, increases the gain value indicating the degree of de-contouring to remove the contour noise.

However, this method of removing contour noise used the gain value indicating the degree of de-contouring as a constant value without considering motion information and detail information.

For example, assuming that the gain value indicating the degree of de-contouring can be set to a maximum of 100, the display device 100 does not perform de-contouring or removes contour noise using a gain value of a certain value of 10.

Alternatively, display device 100 removes contour noise by setting the gain value to one of Off (e.g. 0), Low (e.g. 30), Mid (removing by a medium level, e.g. 60), and High (removing strongly, e.g. 90).

That is, the conventional display device 100 removes contour noise according to a certain gain value without considering the detail information or motion information of the image at all. Therefore, when a strong de-contour gain is applied to output an image containing motion and detail, the image becomes blurred or artifacts are generated at the boundaries of objects included in the image, thereby damaging the image clarity.

Accordingly, the display device 100 can minimize the problem of deterioration of the clarity of the output image by adaptively (dynamically) setting the de-contour gain based on at least one of the motion information and detail information of the image.

Next, referring to FIG. 5, a method for outputting an image by adaptively setting a de-contour gain based on motion information and detail information by a display device according to an embodiment of the present disclosure will be described.

Figure 5:
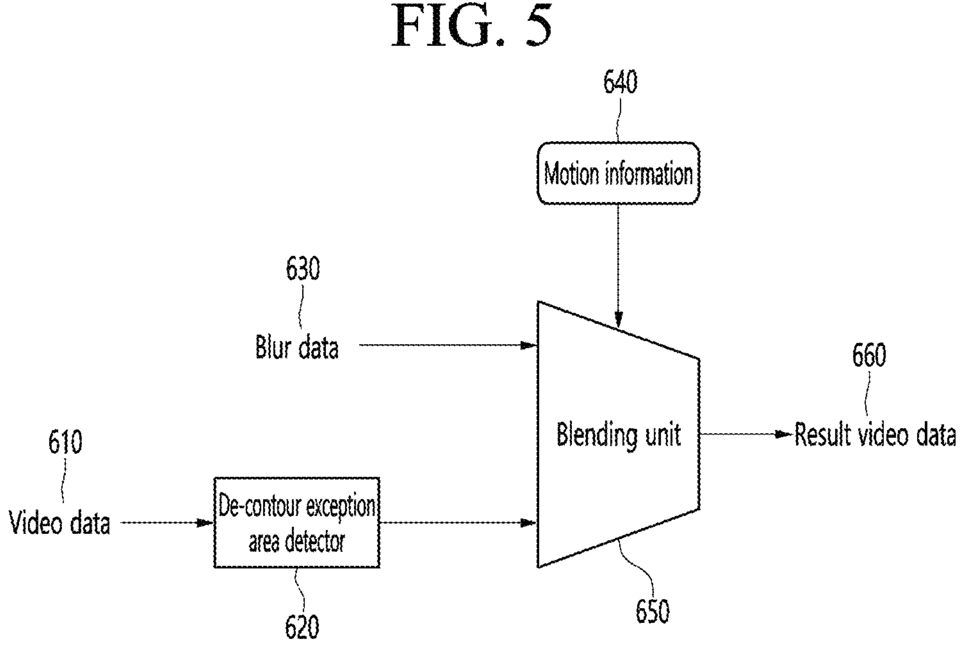
FIG. 5 is a diagram explaining a method for a display device according to an embodiment of the present disclosure to adaptively set a de-contour gain based on motion information and detail information to output an image.

FIG. 5 is a diagram for explaining a method for outputting an image by adaptively setting a de-contour gain based on motion information and detail information by a display device according to an embodiment of the present disclosure.

The controller 170 may include a de-contour exception area detector 620 and a blending unit 650, but this is only distinguished for convenience of explanation, and thus it is reasonable that the controller 170 is not limited thereto.

Referring to FIG. 5, the controller 170 may receive video data 610. The received video data may be input to the de-contour exception area detector 620.

The de-contour exception area detector 620 according to the embodiment of the present disclosure can detect a de-contour exception area to be excluded from the de-contour target. For example, the de-contour exception area can include a high luminance generation area, a skin area, and a detail area.

The de-contour exception area detector 620 can also include a luminance detector for detecting a high luminance generation area, a skin detector for detecting a skin area, and a detail detector for detecting a detail area.

The controller 170 can analyze the video data 610 to detect a high luminance area, a skin area, and an area with a lot of detail components.

The high luminance area can mean an area where an optical density for a specific direction, that is, the change in the amount of light passing through a certain area and entering a certain solid angle, is greater than a certain value.

The skin area can mean an area including a skin and face of a person included in the image.

The detail area may mean an area with a lot of detail components. The detail area may mean an area where feature data related to objects and boundaries included in the image appear.

The de-contour exception area detector 620 may obtain a detail area based on the difference between a pixel value of a predetermined pixel and the pixel value of an adjacent pixel. As a specific example, the de-contour exception area detector 620 can extract a detail area by obtaining the level of detail for each spatial mask having a predetermined block size of video data 610.

The de-contour exception area detector 620 can obtain the level of detail for each spatial mask in a predetermined pixel unit (e.g., 5*5) by moving a location of the spatial mask in a preset manner. For example, the de-contour exception area detector 620 can obtain the detail level of each spatial mask area by calculating the difference by comparing each pixel in the spatial mask with the adjacent pixels. Meanwhile, the block size of the spatial mask can be changed, and if the video data is 4K, the block size can have a pixel unit of 40*40.

The de-contour exception area detector 620 can generate a blur image corresponding to the video data for each spatial mask. The blur image can be an average value of the pixels in one spatial mask. The de-contour exception area detector 620 can obtain the detail level by calculating the difference between the original image of the video data corresponding to the spatial mask and the blur image, which is the average value of the pixels in one spatial mask.

The de-contour exception area detector 620 can obtain detail information by calculating the MAD (Mean Absolute Deviation) for each spatial mask. The de-contour exception area detector 620 can obtain the MAD by comparing the original image of the spatial mask and the blur image of the spatial mask. The MAD can be the sum of the differences between the pixel average value of the original image and the pixel average value of the blur image.

The de-contour exception area detector 620 can determine a detail area with many detail components when the MAD value for each spatial mask is greater than a predetermined value.

The controller 170 can set at least one of the high luminance area, the skin area, and the detail area as the de-contour exception area. In addition, the controller 170 can set the remaining area excluding the de-contour exception area in the entire image as the contour area.

Figure 6:
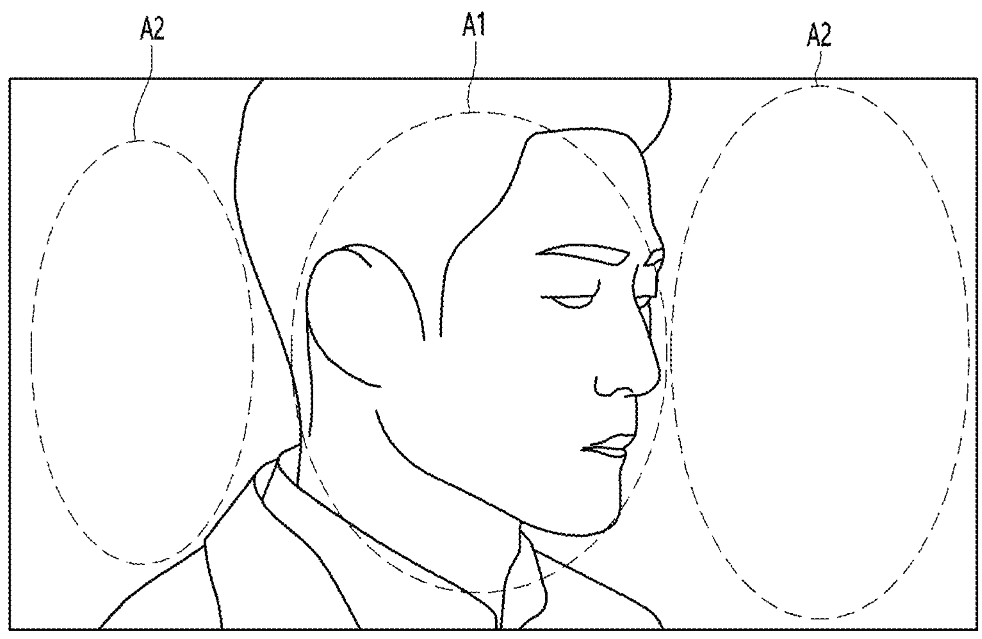
FIG. 6 is an example diagram explaining a de-contour area and a de-contour exception area according to an embodiment of the present disclosure.

FIG. 6 is an example drawing for explaining a de-contour area and a de-contour exception area according to an embodiment of the present disclosure.

In the example of FIG. 6, an area (A1) including skin and detail components may be a de-contour exception area, and a background area (A2) without detail components may be a de-contour area, but this is only an example. A gain value for removing contour noise may not be applied to the de-contour exception area.

Again, FIG. 5 will be described.

The blending unit 650 may receive information on a luminance area, a skin area, and a detail area from the de-contour exception area detector 620. The blending unit 650 may set the luminance area, the skin area, and the detail area as exception areas based on the received information, and generate blur data 630 that blurs the remaining area excluding the exception area in the original image.

The blur data 630 can be alpha-blended with the original video data 610 through the blending unit 650.

The blending unit 650 can blend the original video data 610 and the blur data 630. At this time, the blending can mean inserting a pixel corresponding to the blur data into the video data 610 or alpha blending.

Meanwhile, the blending unit 650 can obtain the motion information 640 from the video data and remove the contour noise based on the de-contour gain corresponding to the motion information 640 to generate the result video data 660. The display (180) can output an image based on the result video data 660.

Meanwhile, the blending unit 650 can obtain the motion information 640 based on the video data 610, and 34 the motion information 640 can mean a value that quantifies the degree of motion included in the video data, i.e., the amount of motion. In the present disclosure, it is explained that the larger the value corresponding to the motion information 640, the more motion is included in the image.

The controller 170 can obtain the motion information 640 based on the difference between a pixel value of a current frame and a pixel value of a previous frame. For example, the controller 170 can extract an area composed of pixels whose pixel values of the current frame and the pixel values of the previous frame are greater than a preset reference value as a motion area, and obtain the motion information 640 that quantifies the degree of motion based on a ratio of the motion area to the entire area of the image.

Meanwhile, a de-contour gain information to which a gain value indicating the degree of de-contour corresponding to the motion information 640 is mapped can be stored in advance in the memory 140.

The de-contour gain information may include a table in which the motion information and its corresponding gain value, i.e., de-contour gain, are mapped. The table in which motion information and its corresponding gain value are mapped is described with reference to FIG. 7. In this specification, gain value, de-contour gain value, and de-contour gain may be used with the same meaning.

Figure 7:
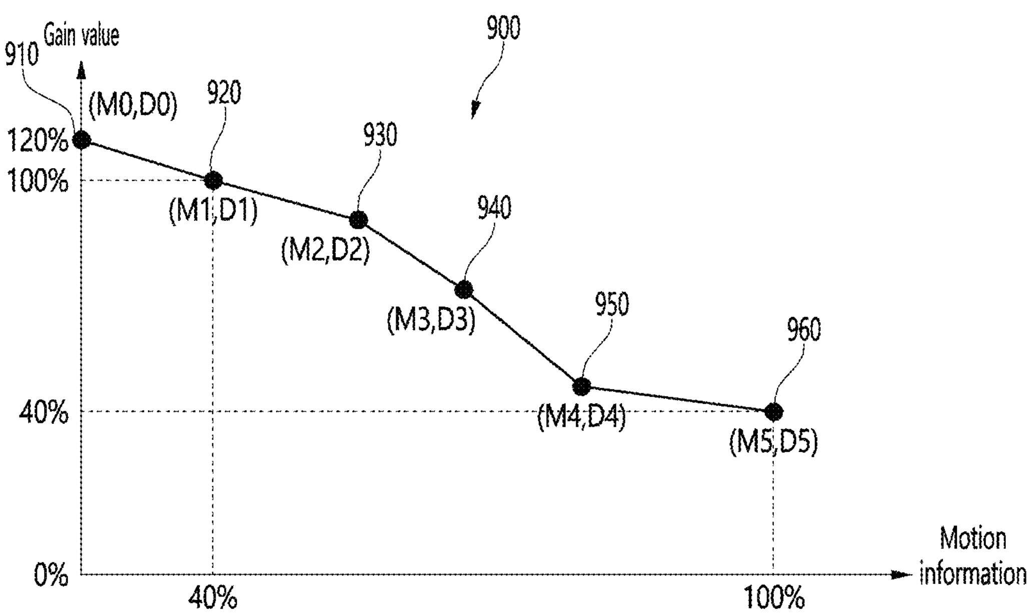
FIG. 7 is a diagram illustrating an example of de-contour gain information according to an embodiment of the present disclosure.

FIG. 7 is a diagram illustrating an example of de-contour gain information according to an embodiment of the present disclosure.

As illustrated in FIG. 7, the de-contour gain information includes a de-contour gain table 900, which may include at least one coordinate data to which motion information and a corresponding de-contour gain value are mapped.

As illustrated in FIG. 7, at least one coordinate data 910 to 960 may be mapped such that the larger the motion information, the smaller the de-contour gain value.

Specifically, referring to the first coordinate 910, if the video data does not include any motion information, and thus the motion information is 0%, the de-contour gain value may be mapped to 120%. This may indicate that when the motion information has a minimum value, the de-contour gain value has a maximum value.

Also, referring to the second coordinate 920, the motion information for the current video data may be M1, and the de-contour gain corresponding to M1 may be D1. In the case where the motion information of the second coordinate 920 is 40%, the de-contour gain value corresponding to the motion information may be 100%.

Also, referring to the sixth coordinate 960, when the motion information is 100%, the de-contour gain value corresponding to the motion information may be 40%. This may indicate that when the motion information has a maximum value, the de-contour gain value has a minimum value.

As in the example described above, the motion information including the remaining coordinates 920 to 950 may be mapped with corresponding de-contour gain values.

It can be confirmed that the multiple coordinates according to the embodiment of the present disclosure are mapped so that the de-contour gain value has a smaller value as the motion information has a larger value, and a de-contour gain table can be generated as a set of multiple coordinates.

Meanwhile, the coordinates are only examples and are not limited to the example of FIG. 7, and in this example, the motion information and de-contour gain are represented as '%', but this should also be understood as an example and can be expressed in various ways.

The de-contour gain information can also be generated as a curve to which the motion information and the corresponding gain value, that is, the de-contour gain, are mapped.

That is, the de-contour gain information includes data to which the motion information and the corresponding gain value are mapped, and can be stored in the memory 140 in various forms such as a table or a curve.

Therefore, the controller 170 can obtain the motion information 640 from the video data, and generate the result video data 660 by removing contour noise based on the de-contour gain value corresponding to the motion information 640.

Meanwhile, if the same de-contour gain value is applied to the entire image, that is, the entire screen, a sharpness degradation problem may occur depending on the characteristics of the image. For example, in the case of a video in which people move in a flat background, such as some music videos, the gain value is obtained low because the amount of motion is large due to the movement of the people, and thus contour noise tends to occur in the background.

Therefore, the display device 100 according to the embodiment of the present disclosure processes the object area where the motion occurred and the remaining area with different gain values when a local motion is detected in one frame, thereby minimizing sharpness degradation in the motion area and minimizing contour noise in the remaining area. For this purpose, display device 100 may store a plurality of de-contour gain tables with de-contour gain information.

Figure 8:
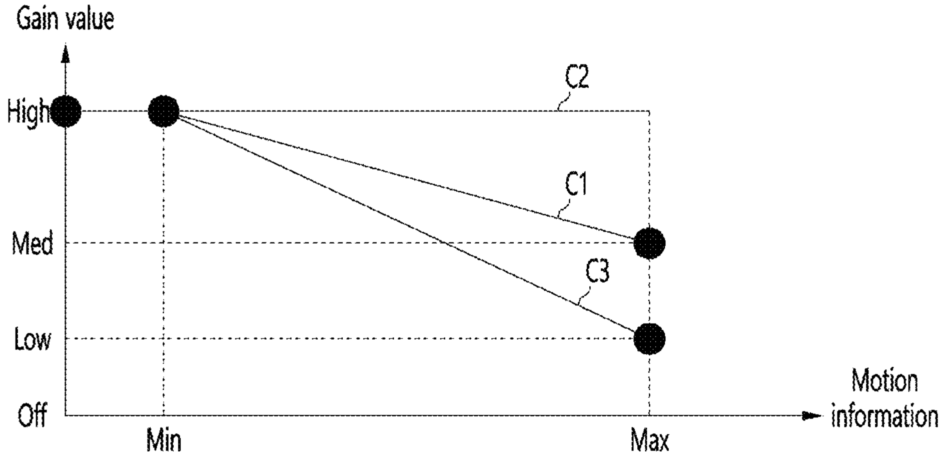
FIG. 8 is a diagram illustrating an example of de-contour gain information according to another embodiment of the present disclosure.

FIG. 8 is a diagram illustrating an example of de-contour gain information according to another embodiment of the present disclosure.

According to another embodiment of the present disclosure, the de-contour gain information may include a plurality of de-contour gain tables C1 C2 C3, and each of the plurality of de-contour gain tables C1 C2 C3 may include at least one coordinate data to which motion information and a corresponding de-contour gain value are mapped.

For example, the memory 140 may store the de-contour gain information, and the de-contour gain information may include first to third de-contour gain tables C1 C2 C3. The controller 170 may obtain the de-contour gain value based on any one of the first to third de-contour gain tables C1 C2 C3 based on the motion information, particularly, the local motion information.

For example, the first de-contour gain table C1 may be used when no local motion occurs, the second de-contour gain table C2 may be used in the remaining area outside the motion area when local motion occurs, and the third de-contour gain table C3 may be used in the motion area when local motion occurs.

The first de-contour gain table C1 may be a table in which the motion information and gain values are mapped when the area of the motion area exceeds a predetermined ratio of the entire image area, the second de-contour gain table C2 may be a table in which the motion information and gain values to be applied to the remaining area are mapped when the area of the motion area is less than or equal to a predetermined ratio of the entire image area, and the third de-contour gain table C3 may be a table in which the motion information and gain values to be applied to the motion area are mapped when the area of the motion area is less than or equal to a predetermined ratio of the entire image area. In the first de-contour gain table C1, when the motion information is maximum, the gain value is the first value (Med), in the second de-contour gain table (C2), when the motion information is maximum, the gain value is the second value (High) greater than the first value (Med), and in the third de-contour gain table (C3), when the motion information is maximum, the gain value may be the third value (Low) less than the first value. In the first to third de-contour gain tables C1 C2 C3) when the motion information is minimum, the gain values may be the same, for example, the second value (High).

Referring to the second de-contour gain table C2, when the area of the motion area is less than or equal to a predetermined ratio of the entire image area, the gain value applied to the remaining area may be constant regardless of the motion information, for example, the second value (High).

That is, the controller 170 can obtain a de-contour gain value based on a first de-contour gain table C1 in which the gain value is a maximum value (e.g., 100%) when motion information is minimum and a gain value is an intermediate value (e.g., 50%) when motion information is maximum if no local motion occurs, obtain a gain value to be applied to a remaining area outside the motion area when local motion occurs based on a second de-contour gain table C2 in which the gain value is a maximum value (e.g., 100%) when motion information is minimum and a gain value is a maximum value (e.g., 100%) when motion information is maximum, and obtain a gain value to be applied to the motion area when local motion occurs based on a third de-contour gain table C3 in which the gain value is a maximum value (e.g., 100%) when motion information is minimum and a gain value is a minimum value (e.g., 20%) when motion information is maximum. However, this is only an example for explanation, so it is reasonable that it is not limited to this.

Figure 9:
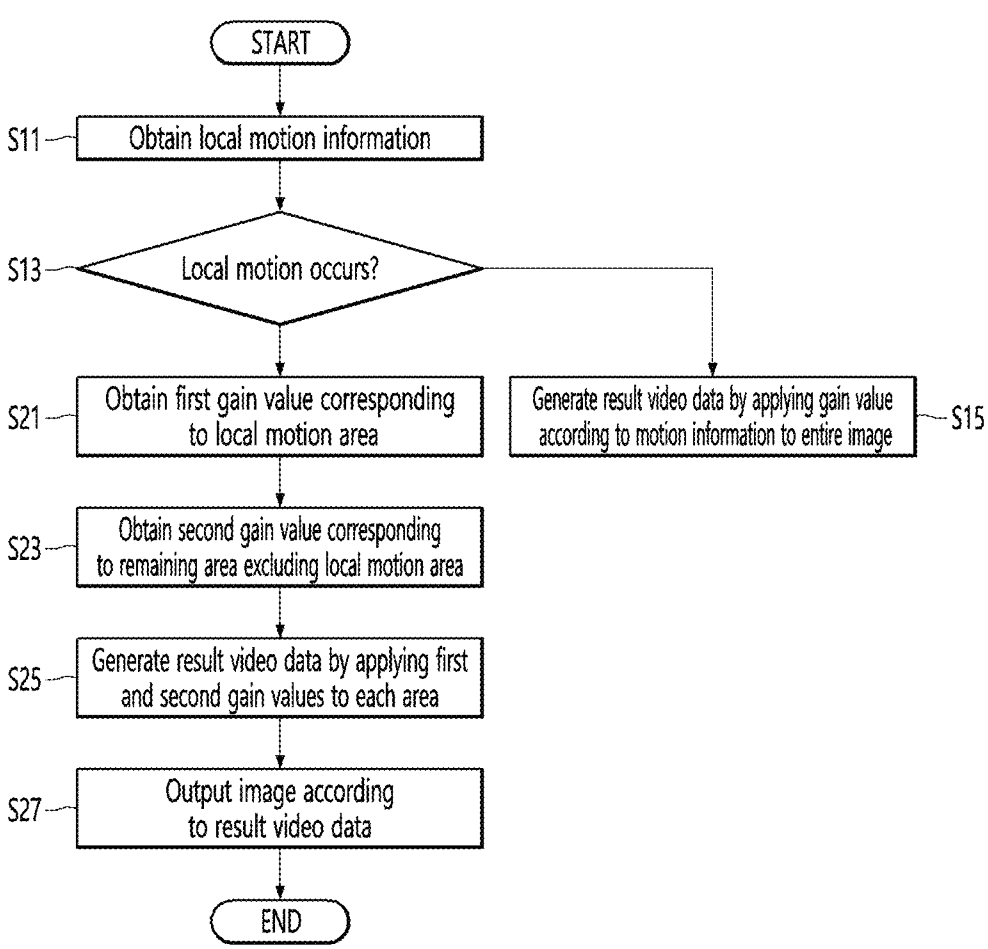
FIG. 9 is a flowchart illustrating an operating method of a display device according to another embodiment of the present disclosure.

Referring to FIG. 9, a method of obtaining a gain value based on local motion information is described in more detail.

FIG. 9 is a flowchart illustrating a method of operating a display device according to another embodiment of the present disclosure.

The controller 170 can obtain local motion information S11.

The controller 170 can obtain the motion information based on differences in pixel data of consecutive frames in video data. In addition, the controller 170 can obtain the local motion information when obtaining the motion information 640 from the video data. The local motion information can be included in the motion information 640.

The local motion information can mean information about local motion in an image. The local motion can mean motion in which the area of the motion occurrence area is less than a predetermined ratio (for example, 50%) of the entire image area. The controller 170 obtains a motion occurrence area by comparing the pixel data difference between each of the previous frame and the current frame, and recognizes the corresponding area as a local motion area if the area of the motion occurrence area is less than or equal to a predetermined ratio (e.g., 50%) of the entire image area.

Figure 10:
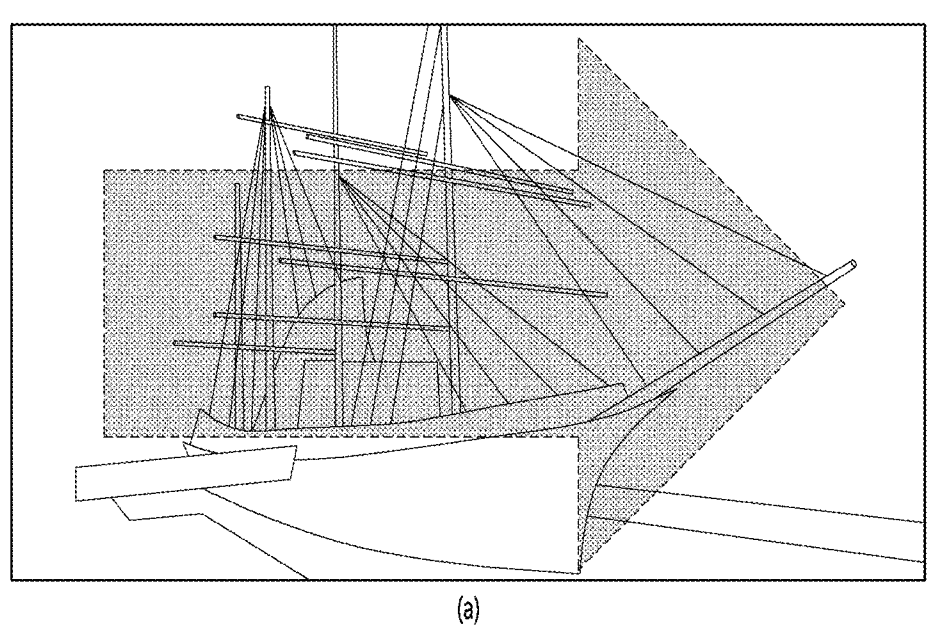
FIG. 10 is an exemplary drawing for explaining local motion according to an embodiment of the present disclosure.
Figure 10:
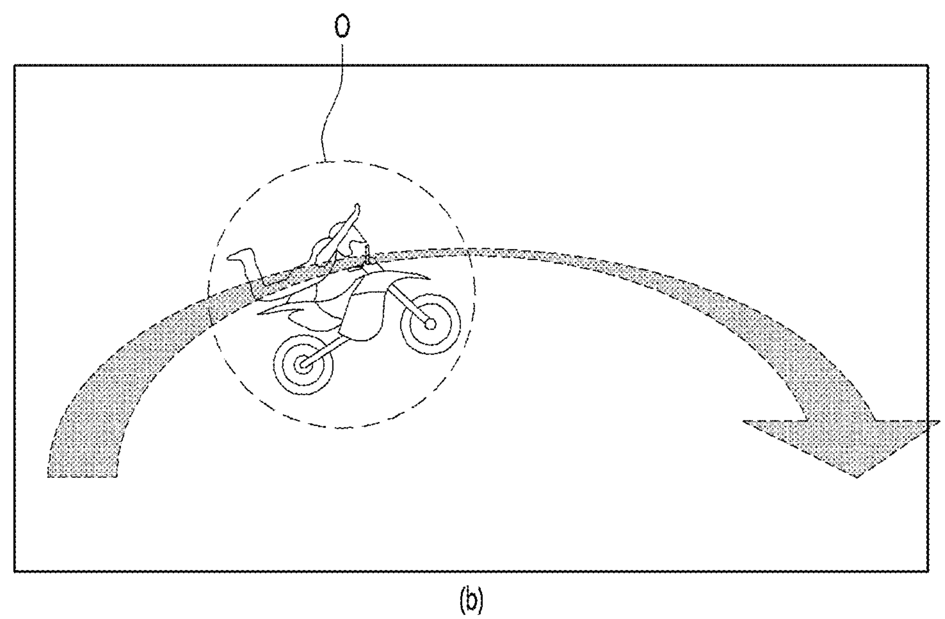

FIG. 10 is an exemplary drawing for explaining local motion according to an embodiment of the present disclosure.

FIG. 10 (*a*) shows an example of an image in which global motion occurs. The global motion is an overall motion of an image, and may be a motion occurring at a predetermined ratio (e.g., 50%) or more compared to the entire image area.

FIG. 10 (*b*) shows an example of an image in which local motion occurs. Since the local motion is the same as described above, duplicate descriptions will be omitted.

As in the example of FIG. 10 (*b*), in the case of local motion, contour noise is likely to occur in the remaining area excluding the local motion area (O) where motion occurs due to an object.

Again, FIG. 9 is described.

The local motion information may include information about the location, area, etc. of the local motion area.

The controller 170 may determine whether local motion occurs S13.

The controller 170 can obtain whether local motion has occurred based on local motion information. For example, the controller 170 can determine that local motion has occurred if a local motion area is recognized, and can determine that local motion has not occurred if a local motion area is not recognized.

The controller 170 can determine that local motion has occurred if the area of the motion area is detected to be less than or equal to a predetermined ratio of the entire image area based on the motion information.

If the local motion has not occurred, the controller 170 can generate result video data by applying a gain value according to the motion information to the entire image S15.

That is, when local motion does not occur, the controller 170 can apply the same gain value to the entire image to generate the result video data.

And, at this time, the controller 170 can obtain a gain value based on the first de-contour gain table C1 of FIG. 8. For example, when local motion does not occur, the controller 170 can obtain an intermediate value (e.g., 50%) as the corresponding gain value if motion information is 100%.

Meanwhile, when local motion occurs, the controller 170 can obtain gain values corresponding to the local motion area and the remaining area excluding the local motion area.

Specifically, the controller 170 can obtain a first gain value corresponding to the local motion area S21, obtain a second gain value corresponding to the remaining area excluding the local motion area S23, and generate the result video data by applying the first and second gain values to each area S25.

At this time, the first gain value may be less than or equal to the second gain value.

Meanwhile, if the area of the motion area described in step S15 is detected to exceed a predetermined ratio of the entire image area (i.e., if local motion does not occur), the gain value applied to the entire image may be the third gain value, and at this time, the third gain value may be greater than or equal to the first gain value and less than or equal to the second gain value.

If the local motion area is recognized, the controller 170 may use different de-contour gain tables to apply different gain values to the local motion area and the remaining area.

The controller 170 may obtain the first gain value to be applied to the local motion area based on the third de-contour gain table C3 of FIG. 8, and obtain the second gain value to be applied to the remaining area excluding the local motion area based on the second de-contour gain table C2 of FIG. 8. For example, if the motion information is 100%, the controller 170 can obtain the first gain value to be applied to the local motion area as the minimum value (e.g., 20%), and obtain the second gain value to be applied to the remaining area as the maximum value (e.g., 100%).

The controller 170 can apply the first gain value to the local motion area and the second gain value to the remaining area to generate the result video data.

That is, if the area of the motion area is detected to be less than or equal to a predetermined ratio of the entire image area based on the motion information, the controller 170 can apply different gain values to the motion area and the remaining area excluding the motion area to obtain the result video data.

The controller 170 can control the display 180 to output an image according to the result video data S27.

Through the above-described method, the controller 170 applies gain values for contour noise removal differently to the motion area and the remaining area, thereby minimizing the problem of reduced clarity in the motion area and simultaneously removing contour noise in the remaining area. In addition, the controller 170 applies gain values for contour noise removal differently depending on whether it is global motion or local motion, thereby protecting the clarity and detail components of the image while more effectively removing contour noise.

According to an embodiment of the present disclosure, the above-described method may be implemented with codes readable by a processor on a medium in which a program is recorded. Examples of the medium readable by the processor include a ROM (Read Only Memory), a Random Access Memory (RAM), a CD-ROM, a magnetic tape, a floppy disk, an optical data storage device, and the like.

The display device as described above is not limited to the configuration and method of the above-described embodiments, but the embodiments may be configured by selectively combining all or part of each embodiment such that various modifications can be made.

The invention claimed is:

1. A display device, comprising:

a controller configured to obtain motion information from video data and generate result video data based on a gain value corresponding to the motion information; and a display configured to output an image based on the result video data, wherein the controller is configured to:

obtain the result video data by applying different gain values to a motion area and a remaining area excluding the motion area, if the area of the motion area is detected to be less than or equal to a predetermined ratio of an entire image area based on the motion information, wherein the controller is configured to:

detect a de-contour exception area that includes at least one of a high luminance area, a skin area, and a detail area, and not apply the gain value to the de-contour exception area.

2. The display device of claim 1, wherein the controller is configured to:

obtain a first gain value to be applied to the motion area, obtain a second gain value to be applied to the remaining area, and the first gain value is less than or equal to the second gain value.

3. The display device of claim 2, wherein the controller is configured to:

obtain a third gain value to be applied to the entire image when the area of the motion area is detected to exceed the predetermined ratio of the entire image area.

4. The display device of claim 3, wherein the third gain value is greater than or equal to the first gain value and less than or equal to the second gain value.

5. The display device of claim 1, further comprising a memory configured to store de-contour gain information including the gain value corresponding to the motion information.

6. The display device of claim 5, wherein the de-contour gain information includes:

a first table in which motion information and a gain value are mapped when the area of the motion area exceeds a predetermined ratio of the entire image area, a second table in which motion information and a gain value to be applied to the remaining area are mapped when the area of the motion area is less than or equal to a predetermined ratio of the entire image area, and a third table in which motion information and a gain value to be applied to the motion area are mapped when the area of the motion area is less than or equal to a predetermined ratio of the entire image area.

7. The display device of claim 6, wherein a gain value when the motion information is maximum in the first table is a first value, a gain value when the motion information is maximum in the second table is a second value greater than the first value, a gain value when the motion information is maximum in the third table is a third value less than the first value.

8. The display device of claim 6, wherein gain values when the motion information is minimum in the first to third tables are the same.

9. The display device of claim 1, wherein the controller is configured to obtain the motion information based on differences in pixel data of consecutive frames in the video data.

10. An operating method of a display device, comprising:

obtaining motion information from video data;

generating result video data based on a gain value corresponding to the motion information;

outputting an image based on the result video data, and wherein the generating of the result video data comprises:

detecting whether an area of a motion area is less than or equal to a predetermined ratio of an entire image area based on the motion information; and obtaining the result video data by applying different gain values to the motion area and a remaining area excluding the motion area, if the area of the motion area is detected to be less than or equal to a predetermined ratio of the entire image area, wherein the generating of the result video data further comprises:

detecting a de-contour exception area that includes at least one of a high luminance area, a skin area, and a detail area, and not applying the gain value to the de-contour exception area.

11. The operating method of the display device of claim 10, wherein the generating of the result video data further comprises:

obtaining a first gain value to be applied to the motion area, and obtaining a second gain value to be applied to the remaining area, and the first gain value is less than or equal to the second gain value.

12. The operating method of the display device of claim 11, wherein the generating of the result video data further comprises:

obtaining a third gain value to be applied to the entire image when the area of the motion area is detected to exceed the predetermined ratio of the entire image area.

13. The operating method of the display device of claim 10, further comprising:

storing de-contour gain information including the gain value corresponding to the motion information.

14. The operating method of the display device of claim 13, wherein the de-contour gain information includes:

a first table in which motion information and a gain value are mapped when the area of the motion area exceeds a predetermined ratio of the entire image area, a second table in which motion information and a gain value to be applied to the remaining area are mapped when the area of the motion area is less than or equal to a predetermined ratio of the entire image area, and a third table in which motion information and a gain value to be applied to the motion area are mapped when the area of the motion area is less than or equal to a predetermined ratio of the entire image area.

15. A display device, comprising:

a controller configured to obtain motion information from video data and generate result video data based on a gain value corresponding to the motion information;

a display configured to output an image based on the result video data; and a memory configured to store de-contour gain information including the gain value corresponding to the motion information, wherein the controller is further configured to:

obtain the result video data by applying different gain values to a motion area and a remaining area excluding the motion area, if the area of the motion area is detected to be less than or equal to a predetermined ratio of an entire image area based on the motion information, wherein the de-contour gain information includes:

a first table in which motion information and a gain value are mapped when the area of the motion area exceeds a predetermined ratio of the entire image area, a second table in which motion information and a gain value to be applied to the remaining area are mapped when the area of the motion area is less than or equal to a predetermined ratio of the entire image area, and a third table in which motion information and a gain value to be applied to the motion area are mapped when the area of the motion area is less than or equal to a predetermined ratio of the entire image area.

* * * * *